No. 759,456. PATENTED MAY 10, 1904.
A. H. MARKS.
RUBBER TIRE.
APPLICATION FILED SEPT. 23, 1903.
NO MODEL.

Witnesses.
E. B. Gilchrist
N. L. Brennan.

Inventor.
Arthur H. Marks
by his attorneys
Thurston & Bates

No. 759,456. Patented May 10, 1904.

UNITED STATES PATENT OFFICE.

ARTHUR H. MARKS, OF AKRON, OHIO.

RUBBER TIRE.

SPECIFICATION forming part of Letters Patent No. 759,456, dated May 10, 1904.

Application filed September 23, 1903. Serial No. 174,256. (No model.)

*To all whom it may concern:*

Be it known that I, ARTHUR H. MARKS, a citizen of the United States, residing at Akron, in the county of Summit and State of Ohio, have invented a certain new and useful Improvement in Rubber Tires, of which the following is a full, clear, and exact description, reference being had to the accompanying drawings.

Rubber tires when in use are subjected to great strains which tend to tear them apart and from the wheel-rims. This is especially true when the tire is, as some tires are, made wholly of the resilient rubber compound which is necessarily employed for the tread portion thereof. Such tires are very frequently torn by the fastening device employed for securing them on the wheel-rim and are always worn more or less by such devices, so that sooner or later the fastening devices cannot hold the tires upon the wheel-rims. To obviate to some extent this specific form of injury, such tires have been formed with a tread portion composed of resilient rubber compound and with a relatively tough and stiff base portion made up of a plurality of layers of fabric, such as canvas, coated and impregnated with a rubber compound, the entire tire so made up being vulcanized. Such tires are improvements upon tires made of the resilient rubber compound only; but they are nevertheless not as strong and durable as is desirable. The various plies forming the base of such a tire are held together only by the cementing action of the vulcanized rubber, and this is also the only means by which the tread portion is secured upon the base. This tread portion is therefore frequently torn from the base, because the cementing action of the rubber is not sufficient to prevent such action, and, moreover, the different plies of the base are not infrequently torn apart.

The object of the present invention is to provide a tire having a strong and stiff base and a relatively resilient tread portion, so constructed that said base and tread portions will not be torn apart in use and in which the various plies of the base will not become separated.

The invention may be said generally to consist of a rubber tire consisting of a flexible tread portion and a relatively strong and stiff base portion, which is interlocked with said tread portion by means of projections on one of said parts which enter the other.

The invention also consists in the more specific characteristics of construction hereinafter described, and definitely pointed out in the claims.

Figure 1:
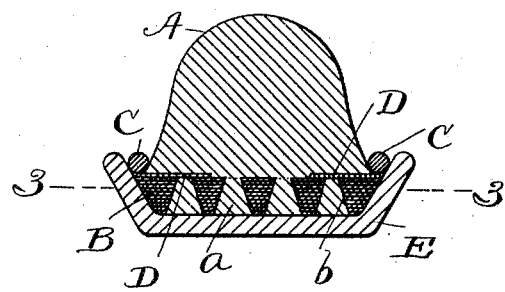
Figure 2:
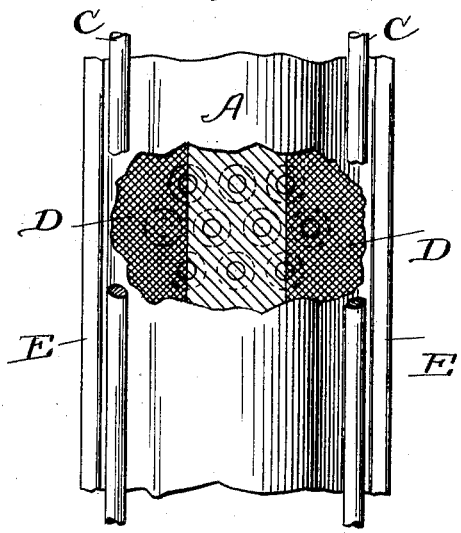
Figure 3:
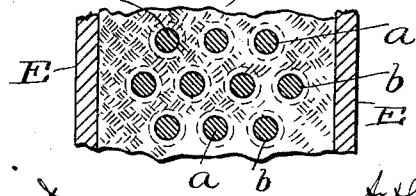

In the drawings, Figure 1 is a transverse sectional view of a tire embodying my invention seated and secured in a wheel-rim of familiar form. Fig. 2 is a plan view thereof, with some of the tread portion broken away to disclose the base; and Fig. 3 is a sectional view in the plane indicated by line 3 3 of Fig. 1.

Referring to the parts by letters, A represents the tread portion of the tire, which may be made of any suitable rubber compound.

B represents the base portion, which is made of a plurality of layers of strong "friction," as canvas, coated and impregnated with rubber. In this base are a plurality of holes $b$. These may be made of any desired shape; but preferably those of one row are staggered in respect to those of adjacent transverse rows. Fitted into these holes are dovetailed tongues $a$, which are homogeneous parts of the tread portion of the tire.

In constructing this tire, the base being first formed of unvulcanized friction—that is to say, fabric covered with unvulcanized rubber—the tread portion A, formed of unvulcanized-rubber compound, is placed thereon and by pressure is caused to flow into and fill said holes, or the holes may be filled with said compound and the tread portion of the tire placed upon the base, wherefore it will unite with the upper end of the rubber in said holes. The entire tire is then vulcanized. These tongues lock together the various layers of friction constituting the base, and they also lock the tread portion to this base.

In the construction shown still greater provision is made for resisting the wear of the fastening devices. These fastening devices are wires C C, which bear directly upon the woven-wire-fabric strips D, which are embedded in the tire upon the base and between it and the tread portion. The rubber compound constituting the tread portion and its tongues pass through the holes in this wire fabric. These wire-fabric strips do not, therefore, to any appreciable extent weaken the connection between the tread and the base, but they do by reason of their superior wearing qualities prevent the tire from being torn by the fastening-wires.

E represents the flanged wheel-rim in which the tire is secured by said wires, which rest on the projecting ends of said wire-fabric strips.

Having described my invention, I claim—

1. A vulcanized-rubber tire consisting of a relatively tough and stiff base portion and a resilient tread portion, said two parts of the tire being interlocked by means of projections on one which enter the other.

2. A vulcanized-rubber tire consisting of a relatively tough and stiff base portion and a resilient tread portion, said two parts of the tire being interlocked by means of projections on the tread portion which enter holes in the base portion.

3. A vulcanized-rubber tire consisting of a resilient tread portion, and a relatively tough and stiff base portion, which two parts are interlocked by means of undercut holes in the base portion and dovetailed tongues, which are homogeneous parts of the tread portion, and which project down into and fill said holes.

4. A vulcanized-rubber tire consisting of a flexible tread portion, and a relatively stiff base made of a plurality of plies of rubber-covered fabric, said base having a plurality of undercut holes which are staggered in respect to those in adjacent transverse rows, and said tread portion having homogeneous dovetailed tongues which project into said holes.

5. A rubber tire consisting of a flexible tread portion, and a relatively stiff base which is interlocked with said tread portion by means of projections on one part which enter holes in the other part, and strips of woven-wire fabric resting upon the base portion and embedded in the rubber of tread portion thereof and adapted to be engaged by wire fastening devices.

6. A rubber tire consisting of a flexible tread portion, and a relatively stiff base which is interlocked with said tread portion by means of projections on one part which enter holes in the other part, and two strips of woven-wire fabric projecting from the edge of the tire inward a short distance in contact with the base portion and embedded in the rubber of the tread portion, combined with a wheel-rim having outwardly-flaring side flanges which are fitted to the sides of the base, and two fastening-wires external to the tire resting upon the projecting edges of said wire strips within the side flanges of the rim.

In testimony whereof I hereunto affix my signature in the presence of two witnesses.

ARTHUR H. MARKS.

Witnesses:
A. H. NOAH,
D. GALEHOUSE.